United States Patent [19]
Konishi

[11] Patent Number: 5,088,338
[45] Date of Patent: Feb. 18, 1992

[54] PLANET GEAR TYPE REDUCTION GEAR DEVICE

[75] Inventor: Keiichi Konishi, Himeji, Japan

[73] Assignee: Mitsubishi Denki K. K., Tokyo, Japan

[21] Appl. No.: 534,901

[22] Filed: Jun. 8, 1990

[30] Foreign Application Priority Data

Jun. 14, 1989 [JP] Japan .................. 1-152669

[51] Int. Cl.⁵ .............................. F02N 15/06
[52] U.S. Cl. ........................ 74/7 E; 475/317
[58] Field of Search ............ 475/317, 331, 346; 74/7 E

[56] References Cited

U.S. PATENT DOCUMENTS

| | | | |
|---|---|---|---|
| 4,494,414 | 1/1985 | Hamano | 74/7 E |
| 4,519,261 | 5/1985 | Hamano | 475/331 X |
| 4,528,470 | 7/1985 | Young et al. | 74/7 E X |
| 4,590,811 | 5/1986 | Kasubachi | 74/7 E |
| 4,604,907 | 8/1986 | Morishita et al. | 74/7 E |
| 4,715,243 | 12/1987 | Morishita et al. | 74/434 |

FOREIGN PATENT DOCUMENTS

| | | | |
|---|---|---|---|
| 1085738 | 7/1960 | Fed. Rep. of Germany | 475/346 |
| 63-167151 | 7/1988 | Japan | 475/331 |

*Primary Examiner*—Leslie A. Braun
*Assistant Examiner*—Benjamin Levi
*Attorney, Agent, or Firm*—Sughrue, Mion, Zinn, Macpeak & Seas

[57] ABSTRACT

A planet gear type reduction gear device comprises a casing, a rotating shaft rotatably supported in the casing, a sun gear formed at an outer circumferential portion of the rotating shaft, a planet gear supported by a support pin and meshed with the sun gear, and an internal gear wheel attached to the inner circumferential portion of the casing and meshed with the planet gear whereby the planet gear revolves around the sun gear while it rotates on the support pin, characterized in that at least one projection is formed at an end surface in the axial direction of the internal gear wheel, and at least one recess having the shape corresponding to the projection is formed in the casing so that the internal gear wheel is fixed to the casing by the mutual engagement.

3 Claims, 3 Drawing Sheets

PLANET GEAR TYPE REDUCTION GEAR DEVICE

BACKGROUND OF THE INVENTION

1. Field of the Invention

The present invention relates to a fixing means to fix an internal gear wheel to a casing in a planetary gear type reduction gear device.

2. Discussion of Background

There has been known the planet gear type reduction gear device of this kind disclosed, for instance, in Japanese Unexamined Patent Publication No. 82046/1986 or Japanese Unexamined Utility Model Publication No. 49070/1986. FIG. 3 is a cross-sectional view showing such a device. In FIG. 3, a reference numeral 1 designates a planet gear supported by a support pin 3 through a sleeve bearing 2, which effects a planetary movement described hereinafter. A numeral 4 designates a sun gear disposed at the central portion of the reduction gear device, a numeral 5 designates an internal gear wheel disposed outside the planet gear 1. A projection 6 is formed integrally with at an outer circumferential surface in the radial direction of the internal gear wheel 5. The internal gear wheel 5 is fixed to the inside of the casing 7 by engaging the projection 6 with a recess 8 formed in the internal circumferential surface of the casing 7.

The operation of the planet gear type reduction gear device having the above-mentioned construction will be described. When a rotating force is applied to the sun gear 4, the planet gear revolves around the sun gear 4 and the inner circumferential surface of the internal gear wheel 5 because the planet gear 1 is meshed with the sun gear 4 and the internal gear wheel 5, and also the planet gear 1 rotates on the support pin 3. In this case, there is no relative movement of the internal gear wheel 5 to the casing 7 because the internal gear wheel 5 is fixed to the casing due to the engagement of the projection 6 with the recess 8, and only the planet gear 1 meshed with the internal gear wheel 5 revolves while it rotates. Thus, the rotating force of the sun gear 4 is transmitted to the support pin 3 so that the support pin 3 rotates at a reduction ratio of $$\frac{Z_1}{Z_1 + Z_3}$$

(where $Z_1$ is the number of teeth of the sun gear 4 and $Z_3$ is the number of teeth of the internal gear wheel 5). As described above, a function of speed-reducing can be obtained.

The conventional planet gear type reduction gear device had such a problem that there was a restriction in dimension in the radial direction of the reduction gear device because of the construction of the fixing means which secures the internal gear wheel 5 to the casing 7 by the engagement of the projection 6 formed at the outer surface in the radial direction of the internal gear wheel 5 with the recess 8 formed in the inner circumferential surface of the casing 7. The outer diameter of the casing 7 is determined in designing a planet gear type reduction gear device. When the number of teeth of the internal gear wheel 5 of the device is to be increased, it is necessary to reduce the wall thickness of the bottom portions of the teeth of the internal gear wheel 5 or to reduce the wall thickness of the casing 7. However, when the wall thickness of the casing 7 is to be reduced, the thickness of the portion where the recess 8 is formed in the casing 7 becomes thinner, whereby a sufficient strength can not be obtained. Further, in a case that the internal gear wheel 5 is made of a resinous material, the wall thickness of the internal gear wheel 5 has to be maintained to provide a strength. On the other hand, when a sufficient strength is to be maintained, the outer diameter of the casing 7 is inevitably large. When there is a restriction in the dimension of the outer diameter in a planet gear type reduction gear device, it is difficult to maintain a predetermined strength.

SUMMARY OF THE INVENTION

It is an object of the present invention to provide a planet gear type reduction gear device capable of increasing the number of teeth of the internal gear wheel while a sufficient strength is maintained.

The foregoing and other objects of the present invention have been attained by providing a planet gear type reduction gear device which comprises a casing, a rotating shaft rotatably supported in the casing, a sun gear formed at an outer circumferential portion of the rotating shaft, a planet gear supported by a support pin and meshed with the sun gear, and an internal gear wheel attached to the inner circumferential portion of the casing and meshed with the planet gear whereby the planet gear revolves around the sun gear while it rotates on the support pin, characterized in that at least one projection is formed at an end surface in the axial direction of the internal gear wheel, and at least one recess having the shape corresponding to the projection is formed in the casing so that the internal gear wheel is fixed to the casing by the mutual engagement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
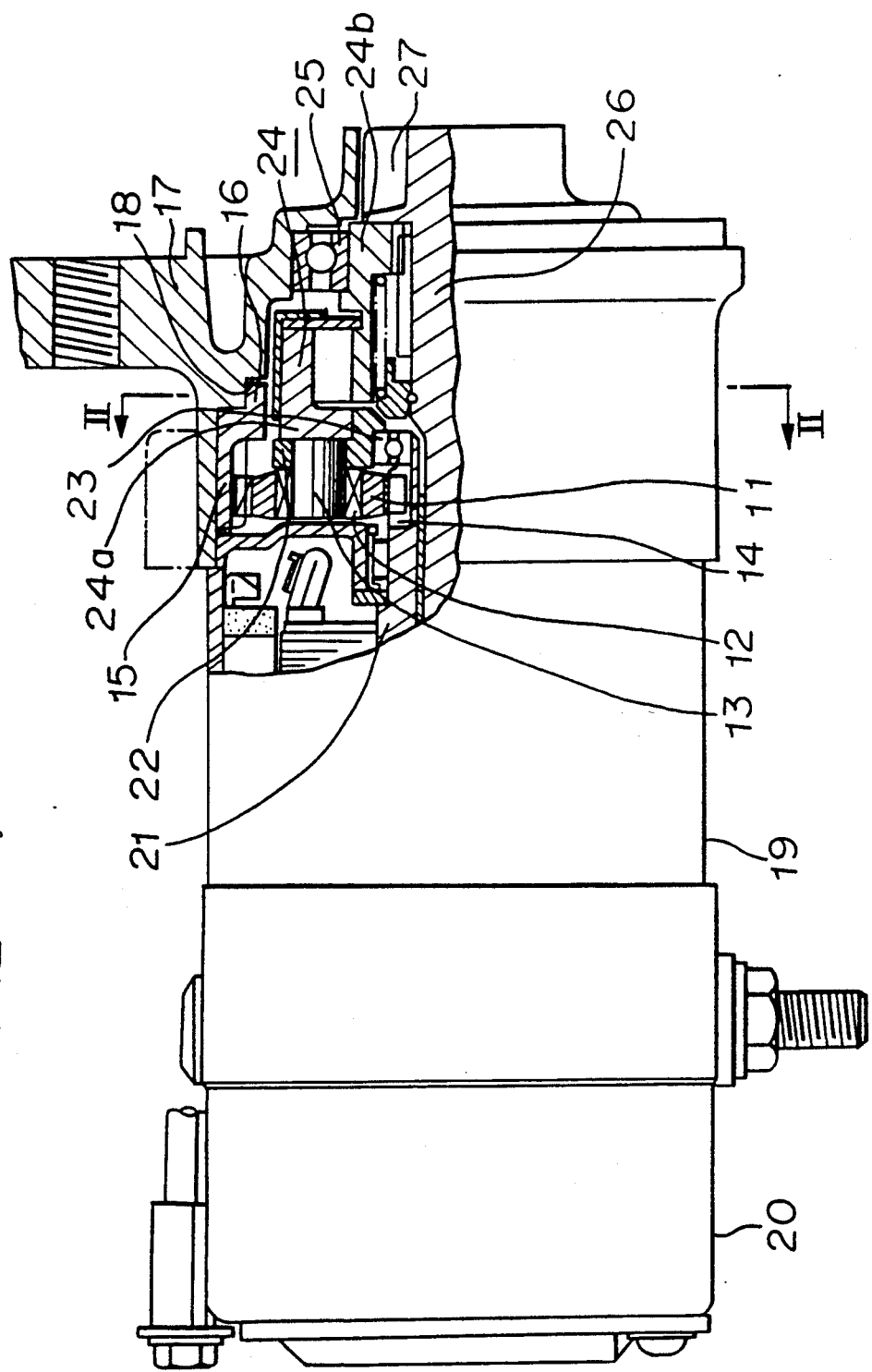
FIG. 1 is a front view partly cross-sectioned of an embodiment of the planet gear type reduction gear device of the present invention which is applied to a coaxial type starter.
Figure 3:
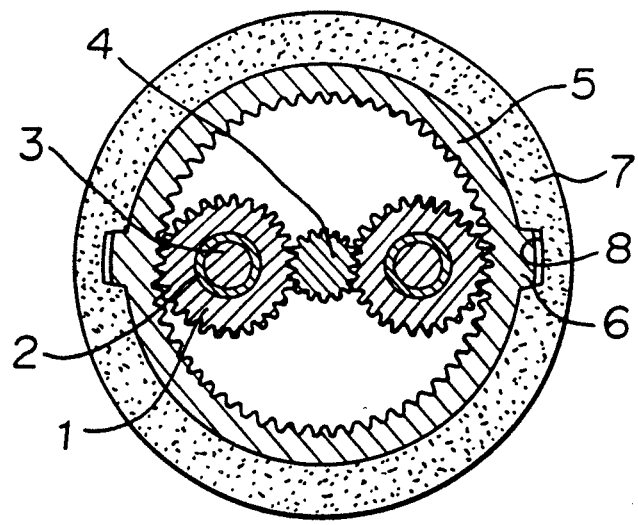
FIG. 3 is a cross-sectional view of a conventional planet gear type reduction gear device.

An embodiment of the planet gear type reduction gear device of the present invention will be described with reference to FIG. 1. FIG. 1 is a front view partly broken of the planet gear type reduction gear device which is applied to a coaxial type starter. In FIG. 1, a numeral 11 designates a planet gear, a numeral 12 designates a sleeve bearing, a numeral 13 designates a support pin, a numeral 14 designates a sun gear, a numeral 15 designates an internal gear wheel made of a resinous material, and a numeral 17 designates a front bracket which constitutes a part of the casing, these parts corresponding to the parts indicated by the numerals 1 through 7 in FIG. 3.

Figure 2:
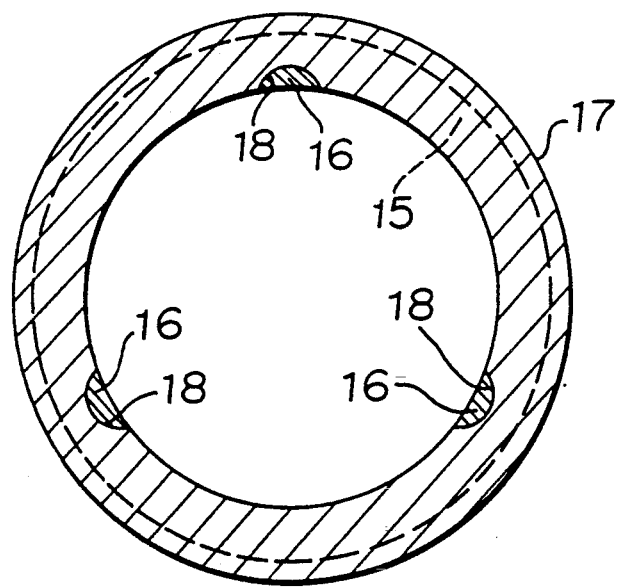
FIG. 2 is a cross-sectional view taken along a line II—II in FIG. 1, of an internal gear wheel and a front bracket in the reduction gear device shown in FIG. 1.

A numeral 16 designates a plurality of projections which are formed integrally with the front end surface in the axial direction of the internal gear wheel 15 (at the right side in the drawing, i.e. at the side opposite the motor section of the coaxial type starter) along its inner circumferential surface. A plurality of recesses 18 are formed in the front bracket 15 so as to correspond to the projections 16 as shown in FIG. 2.

A numeral 19 designates the motor section of the coaxial type starter, a numeral 20 designates an electromagnetic switch attached to the rear side of the motor section 19, and a numeral 21 designates an armature rotary shaft disposed at the central axial line of the motor section 19. The armature rotary shaft 21 is in a tubular shape and has the sun gear 14 at its front end portion.

A planetary frame member 22 to which the support pin 13 is fixed, is supported by the armature rotary shaft 21 through a bearing 23. Further, the planetary frame member 22 is fixed to an overrunning clutch device 24 together with a clutch outer member 24a. A clutch inner member 24b in the overrunning clutch device 24 is supported by a bearing 25 which is fitted to the front bracket 17 and is fitted to a rotary output shaft 26 arranged at the inner circumference of the armature rotary shaft 21 by means of a spline structure. A pinion 27 is formed at the front end of the rotary output shaft 26.

In the planet gear type reduction gear device having the above-mentioned structure, the internal gear wheel 15 is fixed to the front bracket 17 by engaging the projections 16 formed at the front end surface in the axial direction of the internal gear wheel 15 so as to be along the inner circumferential surface with the recesses formed in the front bracket 17. Accordingly, there is no thin walled portion in the radial direction of the front bracket 17 because there is no recesses in the radial direction in the front bracket 17. Accordingly, the wall thickness of the front bracket 17 can be reduced without impairing the strength at the outer circumferential portion of the internal gear wheel 15. Particularly, in the case of the starter described above, the number of teeth of the internal gear wheel 15 can be increased, whereby a reduction ratio in the planet gear device can be increased, and the size of the motor section 19 can be reduced.

In the above-mentioned embodiment, the shape of the projections 16 is shown as of a semi-cylindrical rod. However, the projections 16 may have a shape of cylindrical rod, polygonal rod or the like. Further, the number and the position of the projections are not limited so long as the projections are formed at the end surface in the axial direction of the internal gear wheel. In addition, the internal gear wheel 15 may be made of aluminum besides the resinous material.

The above-mentioned embodiment, the planet gear type reduction gear device of the present invention is applied to a coaxial type starter. However, it may be applied to another device such as a biaxial type starter wherein the operating shaft of the electromagnetic switch is disposed separate from the rotating shaft of the motor.

Thus, in accordance with the present invention, the wall thickness of a casing can be reduced without impairing the strength of the planet gear type reduction gear device, and the number of teeth of the internal gear wheel can be increased in the device having the same dimensions, so that the reduction ratio can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A planet gear type reduction gear device comprising:
    a casing;
    a rotating shaft rotatably supported in the casing;
    a sun gear formed at an outer circumferential portion of the rotating shaft;
    a planet gear supported by a support pin and meshed with the sun gear; and
    an internal gear wheel attached to an inner circumferential portion of the casing and meshed with the planet gear whereby the planet gear revolves around the sun gear and rotates on the support pin, wherein at least one projection is formed at an end surface in the axial direction of the internal gear wheel at the extreme inner peripheral portion thereof, and at least one recess having the shape corresponding to the projection is formed in the casing so that the internal gear wheel is fixed to the casing by the mutual engagement of the projection and the recess.

2. The planet gear type reduction gear device according to claim 1, wherein the projection is formed at the end surface of the internal gear wheel, which is opposite a motor section of a coaxial starter.

3. The planet gear type reduction gear device according to claim 1, wherein three projections are formed at an end of the internal gear wheel.

* * * * *